Aug. 3, 1965    V. DI MAIO    3,198,290
LINE SNUBBING DEVICE
Filed Oct. 28, 1963    2 Sheets-Sheet 1

LOAD END   HOLDING END

INVENTOR.
VINCENT DI MAIO
BY Malcolm W. Fraser
ATTORNEY

Aug. 3, 1965 V. DI MAIO 3,198,290
LINE SNUBBING DEVICE
Filed Oct. 28, 1963 2 Sheets-Sheet 2

INVENTOR.
VINCENT DI MAIO

United States Patent Office 3,198,290
Patented Aug. 3, 1965

3,198,290
LINE SNUBBING DEVICE
Vincent Di Maio, 3546 Camille Drive, Toledo, Ohio
Filed Oct. 28, 1963, Ser. No. 319,299
7 Claims. (Cl. 188—65.1)

This invention relates to a line snubbing device having a variety of uses but more particularly adapted for controlling the sheet of the mainsail or other sails of a sailboat.

An object is to produce a simple line snubbing device by which the line is automatically snubbed when the force on the load end of the line exceeds that on the lead end, but which enables the line to run freely upon release of the lead or holding end, and by which the line moves easily when the force on the lead end exceeds that of the load end.

Another object is to produce a line snubbing device embodying sheaves over which the line passes and at least one of which is fixed and at least one of which can readily shift to and from snubbing position in accordance with the relative forces at the load and lead ends of the line.

A further object is to produce a simple and inexpensive snubbing device of the above character which has a minimum of moving parts, can operate satisfactorily and efficiently without service or attention, and can be produced economically on a large scale quantity production.

Other objects and advantages of the invention will hereinafter appear and, for purposes of illustration but not of limitation, an embodiment of the invention is shown on the accompanying drawings, in which FIGURE 1 is a perspective view of a line snubbing device in accordance with this invention;

Figure 1:
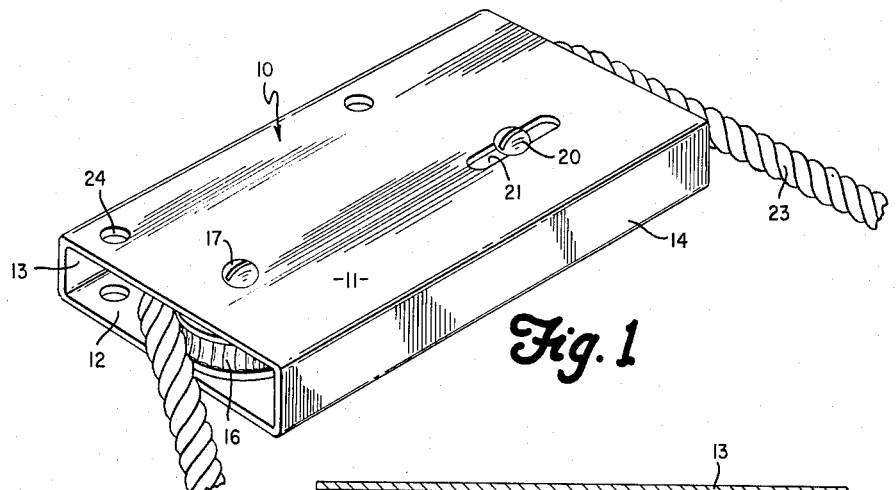

The illustrated embodiment of the invention comprises a sheet metal housing having parallel spaced relatively wide side walls 11 and 12, which, as shown, are integral with relatively narrow side walls 13 and 14. The ends of the housing are open to enable portions of the line to pass freely from opposite ends of the housing, as will hereinafter appear. Arranged intermediate the side walls and disposed in the central portion of the housing is a centerless, free sheave 15 of appreciable size and of a depth slightly less than the thickness of the housing 10 so that it can freely rotate and shift translatorily therein. The sheave 15 can slide or rotate freely on the smooth side wall 13. Preferably, the sheave 15 is of a tough, strong and durable plastic which can effectively withstand changes in temperature conditions. A suitable plastic for the purpose is Delrin but other plastics, such as nylon, may be suitable for the purpose.

Adjacent one end of the housing and arranged somewhat off-center is a relatively small sheave 16, which is rotatable on a pin 17 secured at its ends in the side walls 11 and 12. The sheave 16 may be of the same material as that of the sheave 15. It is arranged close to one open end of the housing, so that the line passing thereover extends immediately to the outside of the housing and downwardly therefrom.

Arranged adjacent the opposite open end of the housing is a third sheave 18 of substantially the same size as that of the sheave 15. The sheave 18 is formed with a relatively large axial hole 19, through which extends a pin 20 which is of relatively small diameter and the ends of which are slideable in horizontally elongate slots 21 formed in the side walls 11 and 12. It will be apparent that the sheave 18 is a relatively free one, the pin 20 merely insuring the retention of the sheave and generally limiting its lateral movements. Manifestly the sheave 18 can move with considerable freedom relative to the pin 20. The sheave 18 is preferably of the same plastic material as that of the sheaves 15 and 16.

The relatively narrow side wall 14 is smooth except for a knurled track portion 22 adjacent one end, against which the sheave 18 has rolling contact when under load conditions, thereby causing the sheave 18 to roll in a direction toward the small fixed sheave 16. Adjacent the outer end of the knurled portion 22 is a smooth side wall portion 25 over which the sheave 18 can freely slide or rotate. A pair of holes 24 are provided in the side walls 11 and 12 to receive a suspending element for the housing so that it can be appropriately mounted.

Figure 2:
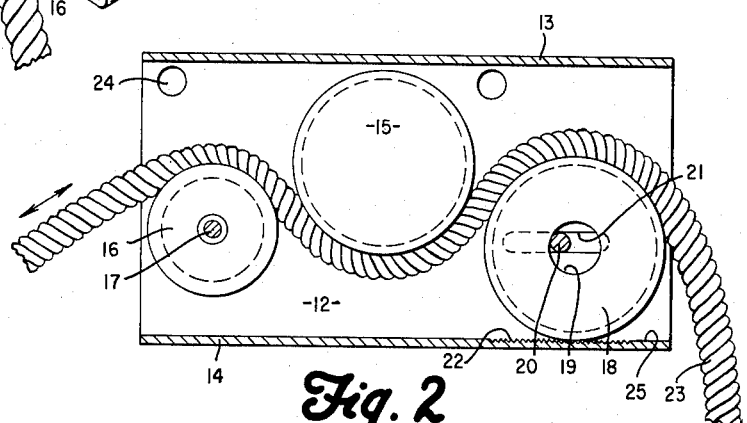
FIGURE 2 is a top plan view of the snubbing device shown in FIGURE 1 with one of the side plates of the housing removed and showing the position of the parts when the line is free for movement in either direction.

A line 23, which may be of nylon cord, cotton, or any suitable material, is threaded over the sheave 18, under the adjacent portion of the sheave 15 and over the small fixed sheave 16, as shown on FIGURE 2. It will be understood that the left-hand end of the line as viewed on FIGURE 2 is the load portion whereas the right-hand portion of the line is the holding or retaining portion and the line at each end of the housing extends downwardly.

Each of the sheaves 15, 16 and 18 has a grooved periphery formed with a knurled surface 26 over which the line 23 passes and which is adapted to bite into the line when under load conditions for insuring positive movement of the sheaves and effecting the desired snubbing action.

Figure 3:
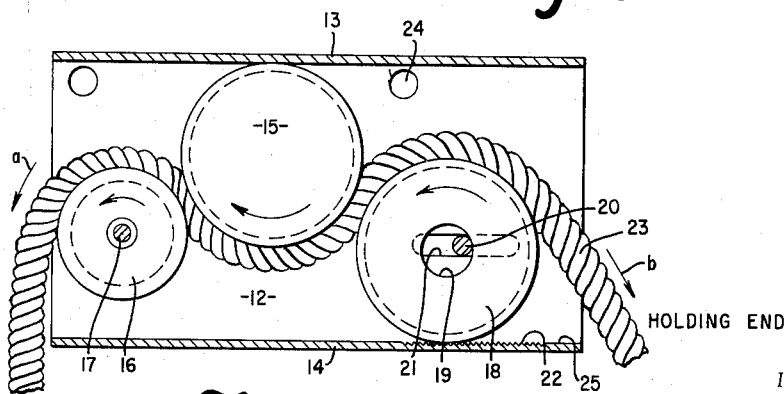
FIGURE 3 is a view similar to that of FIGURE 2 but showing the position of the parts when the load end of the line is subjected to load conditions and the holding end is retained so that a snubbing action is imposed on the line.

In the operation of the snubbing device, a load may be constantly imposed on the load end portion of the line 23 in the direction of the arrow a on FIGURE 3, and the line may extend to the boom of the sailboat where a line pull of the magnitude of 150 pounds may be exerted. The holding end of the line 23 may be held by the operator of the craft, who would exert a pull in the direction of the arrow b. Only a very small fraction of the force is required to hold the line, as compared to the load imposed upon the line. This may be in the region of a forty to one ratio. When the tension exerted in the direction of the arrow a exceeds that in the direction of the arrow b, then at this point the friction causes the centerless sheave 15, as well as the sheave 18, to shift to the left of FIGURE 3 toward the smaller fixed sheave 16. As a result the line 23 is squeezed or pinched between the sheaves 15 and 16 with increasing force as the load becomes greater. This greatly reduces the tension in the direction of the arrow b and eases the strain which would normally be imposed on the operator of the craft, requiring approximately a fifteen pound holding tension, for example, for a one hundred fifty pound pull on the load end.

By slightly reducing the tension recurrently at the holding end of the line 23, the latter may be payed out in increments without difficulty or strain. This is due to the fact that reduction in tension in the direction of the arrow b reduces the friction between the sheaves 18 and 15 with relation to the fixed sheave 16. As a consequence, the thrust is reduced in the direction toward the fixed sheave 16 and the degree of line jambing is reduced, this being dependent upon the extent to which the tension on the line 23 in the direction of the arrow b is reduced. By completely relieving the tension at the holding end of the line, as by releasing the same, the line runs freely in the direction of the arrow *a*.

The line 23 moves freely in the direction of the arrow *b* when a pull or a tension is imposed on the holding end of the inlet slightly in excess of the load because then the sheaves 15 and 18 can thus be shifted away from the fixed sheave 16 and are free to rotate or slide freely. At this time it will be understood that the sheave 15 can slide or rotate freely on the smooth wall 13 and the sheave 18 will have passed over the knurled surface 22 to the smooth surface 25. The only pull in addition to that of the load would be a slight amount of friction created by the line passing over the sheaves and the free sliding of the sheaves on the smooth surfaces of 13 and 25, which is almost negligible. It will be understood that when the pull on the load end exceeds that of the holding end of the line 23 the sheave 18 moves over the knurled surface 22, which causes a positive rotation to that sheave beyond the knurled area.

It will be manifest that the relatively free centerless sheaves can shift from a line pinching or snubbing position to a position in which the line can move freely. In each case the line is abruptly and automatically snubbed when the force on the load end of the line exceeds that of the holding or lead end. The greater the force on the load end, the greater will be the pinching or snubbing action on the line. Upon reducing the tension on the holding end of the line, the line slides in the direction of the load end and upon release of the holding end, the line runs freely. When the tension of the holding end of the line exceeds that of the load end, the line then moves easily toward the holding end, such, for example, as will occur when pulling in the boom of a sail.

Figure 5:
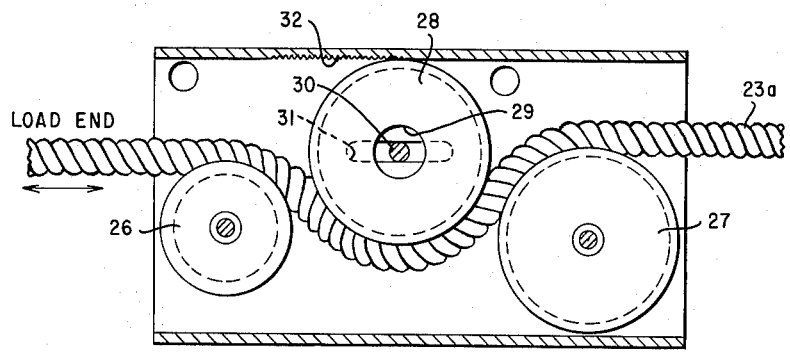
FIGURE 5 is a top plan view of an alternate form of snubbing device.
Figure 4:
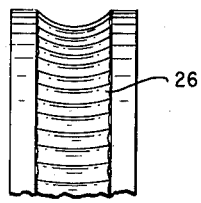
FIGURE 4 is an enlarged fragmentary view of a sheave showing knurling of the peripheral groove.

In the alternate form shown on FIGURE 5, similar sheaves are employed, but in this instance the two end sheaves 26 and 27 rotate about fixed pivots and the intermediate sheave 28 is a floating sheave having an enlarged axial hole 29, a fixed pin 30 and horizontally elongate slots 31 in the adjacent side walls of the housing. A knurled track surface 32 is engaged by the sheave 28 when the line 23*a* is under load conditions to cause positive rotation thereof to insure the desired snubbing action. When the line 23*a* is free of load and conditions are such that the sheave 28 can move to the right (FIGURE 5) and clear the knurled area 32, then the sheaves can rotate or slide freely on the adjacent smooth housing wall. One advantage of this structure is that it enables the line 23*a* to extend straight out from the ends of the housing instead of downwardly as required in the form according to FIGURES 1 to 3.

Numerous changes in details of construction, arrangement and choice of materials may be effected without departing from the spirit of the invention especially as defined in the appended claims.

What I claim is:

1. In a line snubbing device, an open ended housing, three sheaves arranged side by side within said housing, knurled surfaces on the peripheries of said sheaves respectively, a fixed pivot for at least one of the end sheaves, the intermediate sheave being a centerless floating sheave having a portion projecting between the end sheaves, means to limit the movement of said portion of the intermediate sheave from between the end sheaves, and a line threaded over the end sheaves and under the center sheave whereby where a load on the line adjacent the fixed sheave exceeds that of the line portion at the outer side of the other end sheave, the intermediate sheave shifts toward the fixed sheave for pinching the line against the fixed sheave.

2. In a line snubbing device as claimed in claim 1 in which both end sheaves are mounted on fixed pivots.

3. In a line snubbing device as claimed in claim 2 comprising a roughened surface in the housing over which the intermediate sheaves can rotate when under load conditions and an adjacent smooth surface on which such sheave slides under no load conditions.

4. In a line snubbing device, a sheave mounted for rotation on a fixed axis, a pair of sheaves in spaced relation axially from each other and disposed at one side of said fixed sheave, knurled surfaces on the peripheries of said sheaves respectively, means for mounting said second sheaves as centerless translatory shiftable sheaves, the intermediate sheave having a portion projecting between the other sheaves, means to limit the movement of said portion of the intermediate sheave from between the end sheaves, a surface opposed to said limit means for limiting the movement of the other of said pair of sheaves, and a line extending respectively over and under said second sheaves and over said fixed sheave whereby when a load on the line adjacent the fixed sheave exceeds that of the line portion at the outer side of said second sheaves, the latter move toward the fixed sheave for pinching the line against the fixed sheave.

5. In a line snubbing device as claimed in claim 4 comprising a roughened rectilinear surface over which the outermost of the pair of sheaves travels under load conditions to insure positive rolling action thereof, there being a smooth surface at the outer end of the roughened surface over which the respective sheave slides when the load is freed.

6. In a line snubbing device as claimed in claim 4 in which the mounting means includes an open ended housing of a depth slightly greater than the thickness of the sheaves so that the said pair of sheaves can slide toward and away from the fixed rotary sheave and rotate in response to friction imposed thereon by the line under working conditions.

7. In a line snubbing device, a housing, a line, a floating sheave within said housing having translatory sliding and rolling movements therein, a rectilinear surface engageable by said floating sheave, a sheave smaller than said floating sheave and arranged at one side thereof, a means carried by said housing for mounting said smaller sheave on a fixed axis, a third sheave of approximately the same size as said first sheave and arranged on the other side, the floating sheave having a portion projecting between the other sheaves, means to limit the movement of said portion of the floating sheave from between the other said sheaves, the line extending over said third sheave, under said floating sheave and over said smaller sheave, and knurled surfaces on the peripheries of said sheaves respectively.

References Cited by the Examiner

UNITED STATES PATENTS

| | | | |
|---|---|---|---|
| 198,527 | 12/77 | Wethered | 24—136 |
| 252,829 | 1/82 | Rundle et al. | 188—65.3 |
| 278,171 | 5/83 | Oldroyd | 188—65.3 |
| 311,039 | 1/85 | Rehard et al. | 188—65.4 |
| 2,988,795 | 6/61 | French | 24—126 |

FOREIGN PATENTS 3,842  1872  Great Britain.

DONLEY J. STOCKING, *Primary Examiner.*

M. HENSON WOOD, Jr., *Examiner.*